Patented Apr. 21, 1942

2,280,307

UNITED STATES PATENT OFFICE 2,280,307

PROCESS OF MANUFACTURING PAPER

Robert A. Diehm, Appleton, Wis., assignor to Röhm & Haas Company, Philadelphia, Pa.

No Drawing. Application November 25, 1938, Serial No. 242,284

2 Claims. (Cl. 195—8)

This invention relates to a process for treating the raw materials used in manufacturing paper and particularly to a process wherein the raw materials such as wood pulp, straw, etc. are subjected to the action of enzymes.

Cellulose and the non-cellulosic materials associated with it must be hydrated before they may be used in the manufacture of paper. Hydration is usually accomplished by physical agitation in beaters provided for that purpose, a very slow and costly process. The non-cellulosic materials greatly retard the hydration process and it is desirable that as much of these materials be removed from the cellulose fiber as is commercially possible. Heretofore, these substances have been removed by chemical treatment, but this is detrimental to the cellulose fibers themselves and decreases the strength of the resulting paper. In the manufacture of paper from various straws, it is necessary to reduce these straws to a very finely divided state. This has heretofore been done by a combination of chemical and physical treatments. Sufficient chemical treatment to separate the fibers one from the other results in a very undesirable weakening of the fibers themselves.

It has been found that certain enzymes will dissolve or partially dissolve the non-cellulosic materials from the pulp or straw while exerting only a minimum of destructive action on the cellulose. It is thus possible to hydrate pulp and separate fibers in straws with a small fraction of the expensive mechanical treatment heretofore necessary.

The non-cellulosic materials upon which the enzymes act are classified under the general heading of hemicelluloses and are specifically designated as mannans, xylans, levulans, galactans, etc. These substances may also be indexed as those yielding monose and uronic acids upon hydrolysis by dilute mineral acids. Ordinary bleached sulphite pulp contains approximately 86% alpha cellulose and 13% hemicellulose. The ordinary craft and mechanical pulps contain a larger proportion of hemicellulose and the high alpha pulps contain a smaller proportion of hemicellulose.

The enzymes capable of hydrolyzing or dissolving these hemicellulosic substances are regularly designated as hemicelluloses or cytases. Cytases are produced by various bacteria such as *Bacillus carotovorus, Bacterium flavigens*, etc., by crustaceae such as *Helix pomata*, and from mold fungi. The cytases formed from filamentous fungi are preferred because they may be prepared most conveniently, but a cytase derived from any source is suitable for carrying out the pulp and straw treatments of this invention. The active enzyme preparations are conveniently obtained by growing in cultural media one or more of the following fungi: *Aspergillus flavus, Aspergillus parasiticans, Aspergillus fumigatus, Aspergillus niger, Aspergillus oryzae, Aspergillus repens, Aspergillus tamari, Aspergillus wentii, Penicillium glaucum, Monilia sitophila, Rhizopus nigricans, Rhizopus tritici* and *cunninghamella* sp. The culture media may be either liquid or solid but should contain the hemicellulose substances previously mentioned. If the culture medium is a liquid, it may be used as the enzyme preparation after a proper growth of fungus has taken place, or the liquid may be concentrated or dried in any way as desired. If the culture medium is a solid, an aqueous extract of the medium is made after the proper growth of fungus and this extract is used in the enzyme preparation.

In the application of the invention, the pulp or straw and the enzyme are mixed with a considerable quantity of water and the mixture is allowed to stand for a sufficient period to allow the reaction to progress the desired amount. As with all enzymic processes, such conditions as temperature, acidity, and time of action must be properly controlled so as to get the best action from the enzymes. Cytases react most efficiently at temperatures between 40° and 45° C., but they will work at higher or lower temperatures and the temperature may be adjusted to fit the process of pulp treatment into the definitely established manufacturing procedures. The cytases act over a wide range of pH values with the optimum pH range between 4.5 and 5.5. The pH may be varied as desired by adding to the mixture any buffering substance not harmful to the enzyme. It is sometimes necessary to adjust the pH in order to fit the process into the definitely established manufacturing procedures. The period of time necessary for the reaction will depend upon the temperature, the pH of the mixture, and the amount of cytase added. The period will be shorter, the greater the amount of cytase used and the closer the pH and temperature are held to the optimum.

The following examples illustrate the invention but do not limit it in any way.

*Example 1.*—100 pounds of bleached sulfite pulp are suspended in water and the pH adjusted to approximately 4.8 by the addition of one pound of monoammonium phosphate. One pound of cytase is added and the mixture is heated to 45°

C. and allowed to stand at that temperature for six hours. At the end of this time the pulp is placed in a washer where the enzyme is washed away. The hydration of the pulp takes place with approximately one-quarter of the beating necessary to hydrate a pulp not previously subjected to the cytase treatment.

Example 2.—100 pounds of rye straw are run through a mechanical cutter. 150 gallons of water, one pound of mono-ammonium phosphate and one pound of cytase are added to the straw. The mixture is heated to 45° C. and allowed to stand for 24 hours. At the end of this period the straw is subjected to further mechanical cutting and beating. The cellulose fibers are readily separated from each other and the beaten stock is readily made into uniform strong sheets of paper by the customary process.

Kraft, sulfite, alpha, super-alpha, mechanical and cotton pulps are treated as in Example 1 except that the reaction mixture is allowed to stand twenty-four hours instead of six hours. These pulps show hydration rates from two to six times as fast as the corresponding untreated pulp. They show a higher proportion of alpha cellulose after treatment than before treatment, indicating that some of the hemicellulose has been solubilized.

It is to be understood that straws may be treated to remove waxy substances and thus enable the enzyme materials to come in contact more rapidly with the hemicellulose materials therein. This treatment is included in the scope of this invention.

The straws or pulps treated in the herein described manner are converted into paper by any of the processes known to the art. The paper is in general much stronger than paper prepared from pulp treated with strong chemicals, because the cellulose fibers have not been weakened.

I claim:

1. The process of improving the qualities of paper pulp selected from a member of the class consisting of straw, kraft, mechanical, and sulfite pulps which comprises suspending said pulp in water, adding to said mixture a cytase, allowing the mixture to stand until the desired amount of hemi-cellulose has been solubilized, and washing the treated pulp.

2. The process of improving the qualities of paper pulp selected from a member of the class consisting of straw, kraft, mechanical, and sulfite pulps which comprises suspending said pulp in water, adding to said mixture a cytase, allowing the hydrogen ion concentration of said aqueous mixture to a pH between 4.5 and 5.5, warming the mixture to a temperature between about 40° C. and about 45° C., allowing the mixture to stand until a desired amount of hemi-cellulose has been solubilized in the pulp, and washing the treated pulp.

ROBERT A. DIEHM.